No. 681,203. Patented Aug. 27, 1901.
C. J. EDDY.
FRUIT GATHERER.
(Application filed Nov. 27, 1899.)
(No Model.)
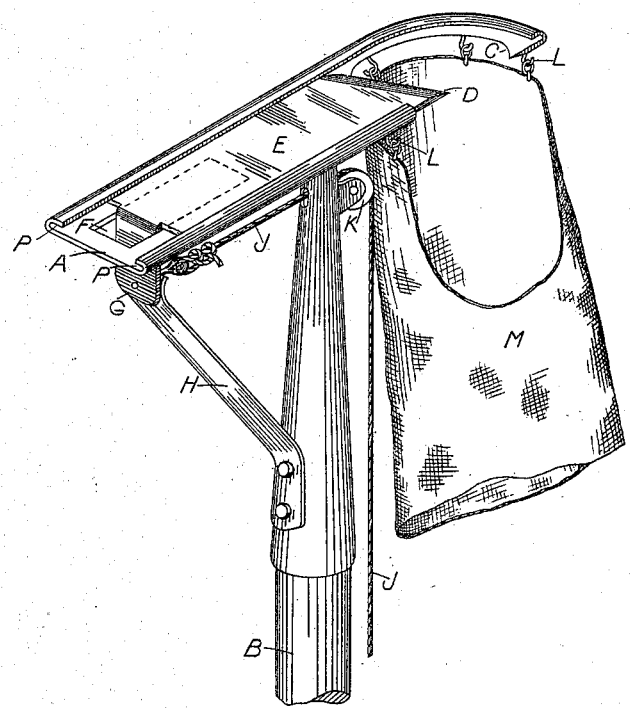
WITNESSES:
INVENTOR
Charles J. Eddy
BY
Pierre Barnes.
his ATTORNEY

United States Patent Office.

CHARLES J. EDDY, OF SEATTLE, WASHINGTON.

FRUIT-GATHERER.

SPECIFICATION forming part of Letters Patent No. 681,203, dated August 27, 1901.

Application filed November 27, 1899. Serial No. 738,437. (No model.)

*To all whom it may concern:*

Be it known that I, CHARLES J. EDDY, a citizen of the United States, residing at Seattle, in the county of King and State of Washington, have invented certain new and useful Improvements in Fruit-Gatherers, of which the following is a specification, reference being had therein to the accompanying drawing.

My invention relates to that class of fruit-gatherers in which the fruit is detached from the tree by a cutter attached to a pole or staff and dropped into a receptacle; and the object of my invention is to furnish a simple and efficient device for so gathering fruit.

Referring to the accompanying drawing, which is a perspective view of my invention, A represents the headpiece, secured transversely to a staff or pole B and having a hook-shaped cutting edge C opposed to a transversely-arranged cutting edge D on a slidable blade E. Projecting downwardly through a slot F in a headpiece A is a lug G, integral with the slidable blade E and adapted to be operatively engaged by a spring H, which forces the slidable blade E to the position shown, the cutting edges being normally apart.

J is a line attached to the slidable blade and, passing over a sheave K, leads to the operator, who by a downward pull thereon puts the cutter into operation.

P P are guideways.

Suspended, preferably by hooks L, from the headpiece A and immediately below the cutting edges C and D is a flexible receptacle or tube M, having a portion of the side thereof cut away to allow the admission of the fruit below said cutting edges and within the mouth of the receptacle.

It will be noted that as the headpiece A and sliding blade E are arranged directly transverse to the pole B the pole may be held nearly or quite vertical, while bringing the cutting devices into most advantageous position for cutting the stem. Moreover, the flexible receptacle being suspended directly from the hooked end of the headpiece, with its mouth conforming to such curved end and the gap formed between the hooked cutting edge C and the movable cutting edge D, it is in the most advantageous position to receive the fruit without any special care on the part of the operator. All the latter has to do is to bring the implement into position so that the stem of the fruit enters within the gap aforesaid and then pull the cord. The receptacle will then, being directly beneath the gap, receive the fruit as a matter of course. The fact that the upper end of the flexible receptacle conforms to the hooked end of the headpiece and is substantially no larger than the gap between the cutting edges is also of advantage, as it prevents the receptacle from obscuring the fruit more than is necessary while getting the implement into position. The cutting away of the side of the receptacle corresponding to the opening on one side of the gap aforesaid enables the implement to be introduced over the fruit from the side, which can generally be done more conveniently than from the bottom.

Having thus described my invention, what I claim as new, and desire to secure by Letters Patent, is—

1. In an implement of the character described, the combination with a handle or staff, and a headpiece arranged directly transverse to said handle and having a projecting hooked end with a cutting edge therein; of a spring and cord actuated blade sliding transversely to said handle in guideways formed on said headpiece, substantially as set forth.

2. In an implement of the character described, the combination with a handle or staff B, and a headpiece A arranged directly transverse to said handle and having a projecting hooked end with a cutting edge C therein; of a blade E sliding transversely to said handle in guideways P formed on said headpiece, a spring H and a line or cord J for operating said blade.

In testimony whereof I affix my signature in presence of two witnesses.

CHARLES J. EDDY.

Witnesses:
 PIERRE BARNES,
 ERNEST E. GILMER.